(12) United States Patent
Zagone

(10) Patent No.: US 6,434,476 B1
(45) Date of Patent: Aug. 13, 2002

(54) HIGH VOLTAGE FAULT DISCRIMINATION FOR EGR TEMPERATURE SENSOR

(75) Inventor: Peter Zagone, Huntington Woods, MI (US)

(73) Assignee: Detroit Diesel Corporation, Detroit, MI (US)

( * ) Notice: Subject to any disclaimer, the term of this patent is extended or adjusted under 35 U.S.C. 154(b) by 10 days.

(21) Appl. No.: 09/679,478

(22) Filed: Oct. 4, 2000

(51) Int. Cl.[7] ............................ G06F 17/00; F02M 25/07
(52) U.S. Cl. ........................ 701/115; 701/114; 701/108; 123/568.16
(58) Field of Search .................. 123/568.19, 568.22, 123/568.29, 568.16, 568.31, FOR 124; 701/108, 102, 101, 114, 115, 109; 73/118.2, 117.3

(56) References Cited

U.S. PATENT DOCUMENTS

| | | | |
|---|---|---|---|
| 4,780,826 A | * 10/1988 | Nakano et al. | 123/479 |
| 4,834,054 A | * 5/1989 | Hashimoto et al. | 701/108 |
| 4,870,941 A | * 10/1989 | Hisatomi | 123/568.16 |
| 4,967,717 A | * 11/1990 | Miyazaki et al. | 73/116 |
| 5,224,453 A | * 7/1993 | Bederna et al. | 73/118.1 |
| 5,243,852 A | 9/1993 | Morita | |
| 6,102,015 A | 8/2000 | Tsuyuki et al. | |
| 6,112,150 A | * 8/2000 | Irons et al. | 701/115 |

FOREIGN PATENT DOCUMENTS

| | | | | |
|---|---|---|---|---|
| JP | 63-263253 | * | 10/1988 | F02M/25/06 |
| JP | 01-147152 | * | 6/1989 | F02M/25/06 |
| JP | 01-147153 | * | 6/1989 | F02M/25/06 |
| JP | 01-294951 | * | 11/1989 | F02M/25/06 |
| JP | 02-227544 | * | 9/1990 | F02M/25/07 |
| JP | 09072247J | | 3/1997 | |
| JP | 10-306740 | * | 11/1998 | F02D/41/06 |

* cited by examiner

Primary Examiner—John Kwon
Assistant Examiner—Hieu T. Vo
(74) Attorney, Agent, or Firm—Brooks & Kushman P.C.

(57) ABSTRACT

Systems and methods for discriminating between an EGR temperature sensor fault and actual EGR temperatures which produce similar signals includes suppressing high voltage faults for a calibratible period of time after the engine is started. Alternatively, or in addition, a sensor fault is not indicated unless secondary indicators suggest that EGR temperature is sufficiently different from the EGR temperature corresponding to the sensor signal. Secondary indicators may include signals provided by various other engine and/or vehicle sensors such as an ambient air temperature sensor, engine coolant temperature sensor, oil temperature sensor, or the like.

20 Claims, 3 Drawing Sheets

HIGH VOLTAGE FAULT DISCRIMINATION FOR EGR TEMPERATURE SENSOR

TECHNICAL FIELD

The present invention relates to apparatus and methods for discriminating between an EGR temperature sensor fault and operating conditions which may produce a similar sensor signal.

BACKGROUND ART

As engine technology becomes increasingly more sophisticated, the number and variety of sensors used in controlling the engine has continued to climb. Typical engines may include 20 or more sensors used to provide information to the vehicle owner, operator, and service personnel and/or used to control the engine. Sensors may be used to provide engine protection by quickly detecting adverse operating conditions which may indicate a fault or malfunction to reduce or eliminate any permanent engine damage. The engine control module (ECM) monitors the sensor inputs to detect conditions which may trigger a diagnostic code or fault which may be used by owners/operators and/or service and maintenance personnel to troubleshoot and repair the engine.

In addition to monitoring sensor inputs to detect potential engine problems, the ECM typically includes logic to detect whether the sensor itself is functioning properly. However, depending upon the particular sensor, it is often difficult to determine whether the sensor is malfunctioning or whether the sensor is accurately detecting an actual engine condition. Setting an inappropriate diagnostic code may lead to unnecessary replacement of sensors or other components with the attendant increase of maintenance and warranty costs. As such, it is desirable to provide control logic which can detect a faulty sensor and set an appropriate fault or diagnostic code by discriminating between signals which indicate an actual engine condition and similar or identical signals which indicate a sensor fault.

DISCLOSURE OF INVENTION

An object of the present invention is to provide a system and method for accurately detecting a sensor fault.

Another object of the present invention is to provide a system and method for detecting a high-voltage fault for an EGR temperature sensor.

A further object of the present invention to improve the reliability of fault codes set by the ECM.

Yet another object of the present invention is to provide a sensor fault detector which uses secondary indicators to determine the reliability of the sensor signal.

Another object of the present invention is to provide an engine control system and method which detects a failed EGR temperature sensor based on signals received from at least one other engine or vehicle sensor.

A further object of the present invention is to provide a system and method for accurately detecting a sensor malfunction by suppressing a corresponding fault code for a period of time after engine start.

In carrying out the above objects, and other objects, features, and advantages of the invention a system and method for detecting a failed EGR temperature sensor include monitoring the sensor signal and comparing the signal to a threshold. When the signal or corresponding value crosses the associated threshold, secondary indicators are examined to discriminate between a failed sensor and an accurate sensor signal. In one embodiment, the secondary indicators include at least one other temperature sensor, such as an ambient air temperature sensor, a coolant temperature sensor, and/or an oil temperature sensor which may be used to infer a likely temperature or temperature range for the sensor in question. In another embodiment of the present invention, the secondary indicator is an elapsed time after engine start which may also be used to infer a likely temperature or temperature range for the sensor being monitored. In this embodiment, a sensor fault code is suppressed for a calibratible period of time after an engine start.

The present invention provides a number of advantages. For example, the present invention reduces false diagnostic or fault codes which may lead to unnecessary sensor or component replacement. The invention also allows detection of a sensor failure based on a signal which is similar or identical to a properly functioning sensor using secondary indicators, such as other sensors, or elapsed engine running time. As such, the present invention provides inherent redundancy without requiring a redundant sensor.

The above advantages, and other advantages, objects, and features of the present invention are readily apparent from the following detailed description of the best mode for carrying out the invention when taken in connection with the accompanying drawings.

BEST MODE FOR CARRYING OUT THE INVENTION

Figure 1:
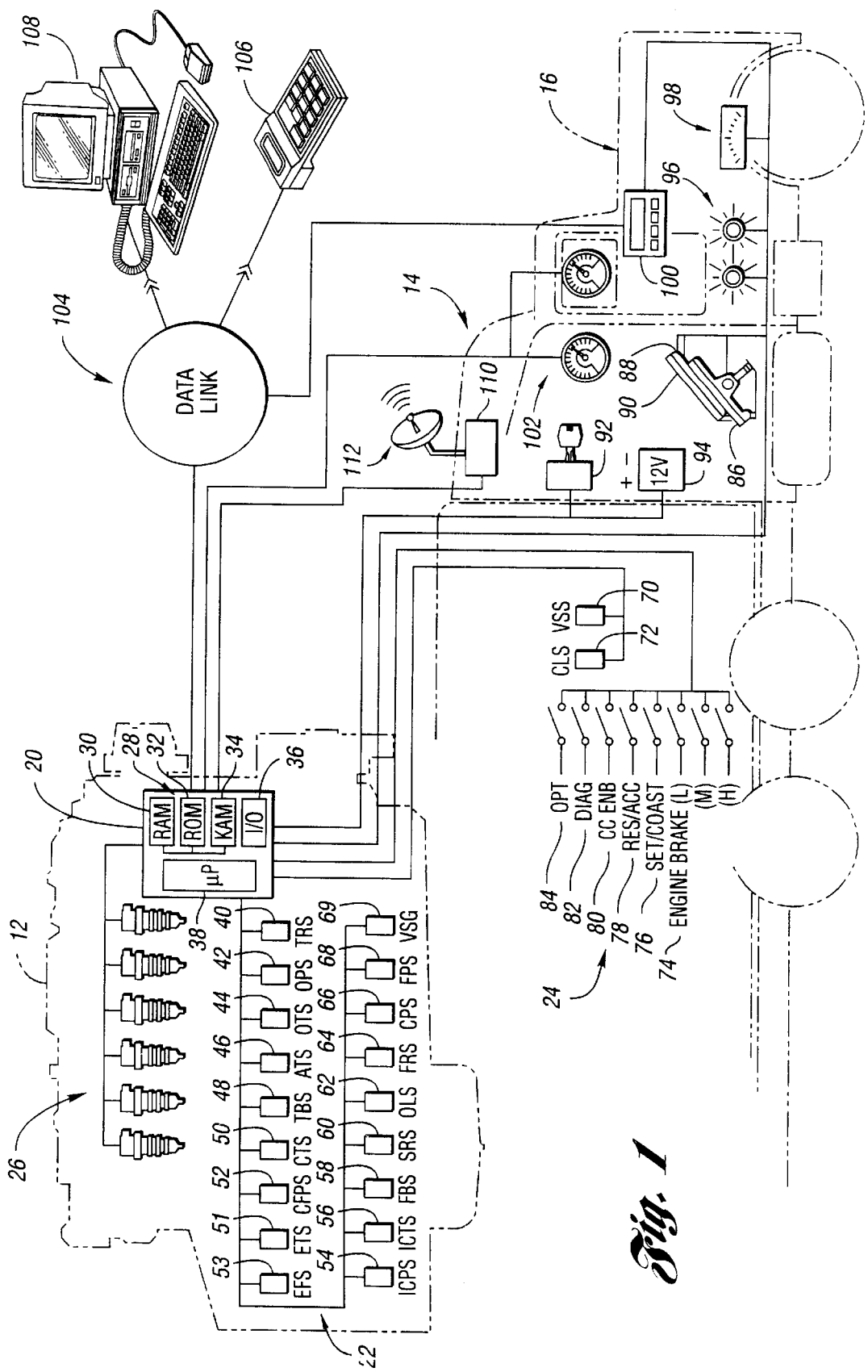
FIG. 1 is a block diagram illustrating an internal combustion engine with representative sensors for use in detecting a high voltage EGR sensor fault according to one embodiment of the present invention.

FIG. 1 provides a schematic/block diagram illustrating operation of a system or method for detecting a sensor fault according to one embodiment of the present invention. System 10 includes an internal combustion engine, such as a diesel engine 12, which may be installed in a vehicle 14 depending upon the particular application. In one embodiment, vehicle 14 includes a tractor 16 and semi-trailer 18. Diesel engine 12 is installed in tractor 16 and interfaces with various sensors and actuators located on engine 12, tractor 16, and semi-trailer 18 via engine and vehicle wiring harnesses as described in further detail below. In other applications, engine 12 may be used to operate industrial and construction equipment, or in stationary applications for driving generators, compressors, and/or pumps and the like.

An electronic engine control module (ECM) 20 receives signals generated by engine sensors 22 and vehicle sensors 24 and processes the signals to control engine and/or vehicle actuators such as fuel injectors 26. ECM 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, computer-readable storage media 28 include a random access memory (RAM) 30 in addition to various non-volatile memory such as read-only memory (ROM) 32, and keep-alive memory (KAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, and the like.

In a typical application, ECM 20 processes inputs from engine sensors 22, and vehicle sensors/switches 24 by executing instructions stored in computer-readable storage media 28 to generate appropriate output signals for control of engine 12. Depending upon the particular application, system 10 may include various types of sensors to monitor engine and vehicle operating conditions. For example, variable reluctance sensors may be used to monitor crankshaft position and/or engine speed. Variable capacitance sensors may be used to monitor various pressures such as barometric air, manifold, oil gallery, and optional pump pressures. Variable resistance sensors may be used to monitor positions such as a throttle (accelerator foot pedal) position. Magnetic pick-up sensors may be used to sense vehicle speed, accumulate trip distance, and for various other vehicle features. Likewise, thermistors may be used to monitor various temperatures such as coolant, oil, and ambient air temperatures, for example. In one embodiment of the present invention, engine sensors 22 include a timing reference sensor (TRS) 40 which provides an indication of the crankshaft position and may be used to determine engine speed. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake air temperature. A turbo boost sensor (TBS) 48 is used to provide an indication of the boost pressure of a turbocharger. Coolant temperature sensor (CTS) 50 is used to provide an indication of the coolant temperature.

Depending upon the particular engine configuration and application, various additional sensors may be included. For example, engines which utilize exhaust gas recirculation (EGR) include an EGR temperature sensor (ETS) 51 and an EGR flow sensor (EFS) 53. Applications utilizing a common rail fuel system may include a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. Engine 12 also preferably includes a fuel temperature sensor (FTS) 58 and a synchronous reference sensor (SRS) 60. SRS 60 provides an indication of a specific cylinder in the firing order for engine 12. This sensor may be used to coordinate or synchronize control of a multiple-engine configuration such as used in some stationary generator applications.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure which may be used for various engine protection features by detecting a sudden increase in crankcase pressure indicative of an engine malfunction.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84. ECM 20 also receives signals associated with an accelerator or foot pedal 86, a clutch 88, and a brake 90. ECM 20 may also monitor position of a key switch 92 and a system voltage provided by a vehicle battery 94.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100. Preferably, ECM 20 includes control logic to detect a failed ETS according to the present invention and may broadcast an associated fault code as described in greater detail below.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14.

Figure 2:
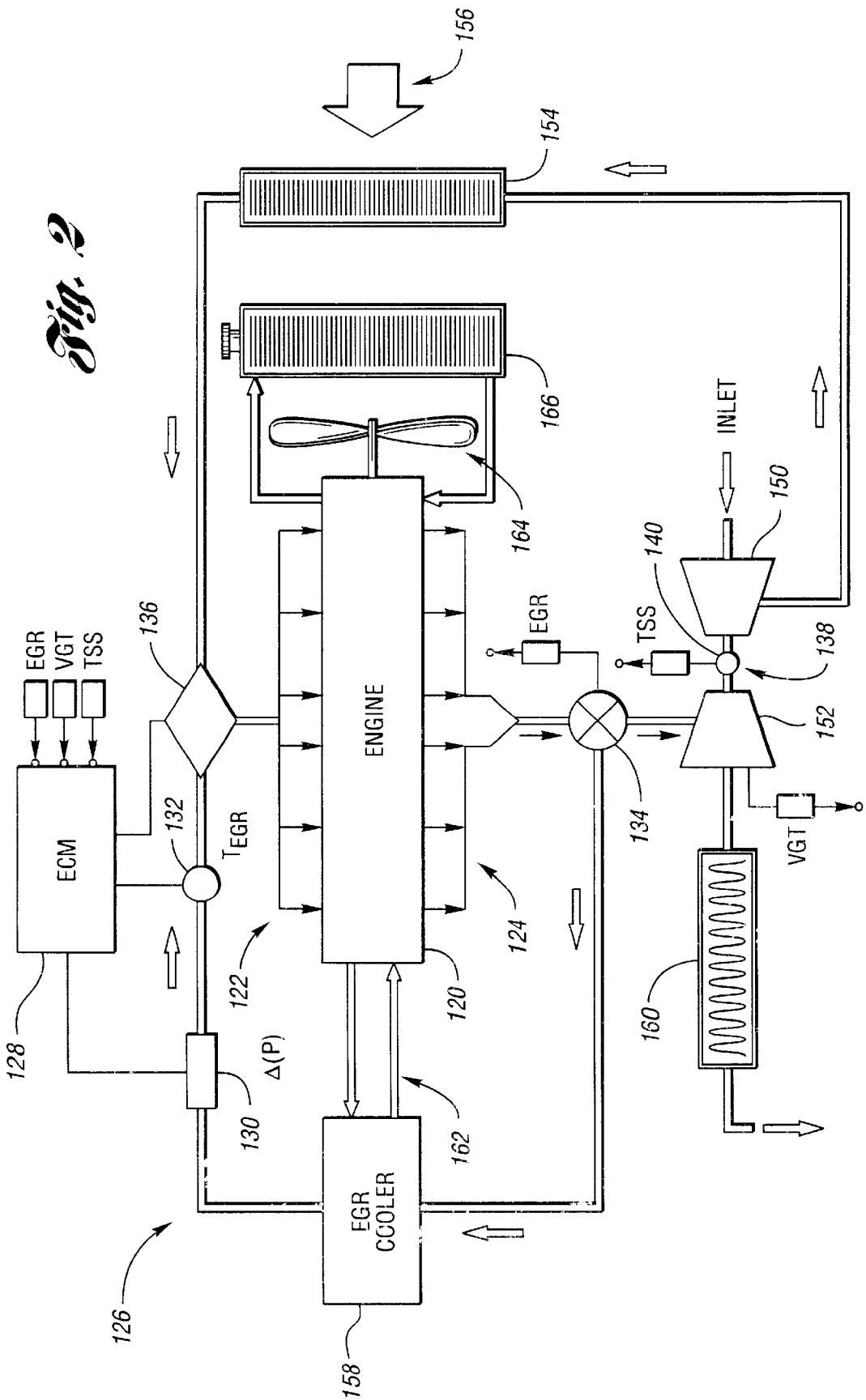
FIG. 2 is a block diagram illustrating an internal combustion engine with an EGR system with fault diagnostics for one embodiment according to the present invention.

FIG. 2 is a block diagram illustrating an EGR system with associated EGR temperature sensor and diagnostic logic according to the present invention. Engine 120 includes an intake manifold 122, an exhaust manifold 124, and an exhaust gas recirculation (EGR) system indicated generally by reference numeral 126. An engine control module (ECM) 128 includes stored data representing instruction and calibration information for controlling engine 120. ECM 128 communicates with various sensors and actuators including EGR sensors such as EGR flow sensor 130 and EGR temperature sensor 132. ECM 128 controls EGR system 126 via actuators such as an EGR valve 134. In addition, ECM 128 preferably controls a variable nozzle or variable geometry turbocharger (VGT) 138 and monitors an associated turbo speed sensor 140.

In operation, ECM 128 controls EGR system 126 and VGT 138 based on current operating conditions and calibration information to mix recirculated exhaust gas with charge air via EGR valve 134 which is provided to engine 120 through intake manifold 122. In one preferred embodiment, engine 120 is a 6-cylinder compression-ignition internal combustion engine. ECM 128 includes control logic to monitor current operating conditions and operation of various sensors including EGR flow sensor 130 and EGR temperature sensor 132. According to the present invention, ECM 128 includes control logic to detect a fault or malfunction of EGR temperature sensor 132. The control logic uses secondary indicators to determine whether a maximum-value signal generated by EGR temperature sensor 132 corresponds to an actual EGR temperature or indicates a sensor malfunction.

During operation of engine 120, intake air passes through compressor portion 150 of VGT 138 which is powered by turbine portion 152 via hot exhaust gasses. Compressed air travels through charge air cooler 154 which is preferably an air-to-air cooler cooled by ram air 156. Charge air passes through cooler 154 to mixer valve 136 which is preferably a pipe union where it is combined with recirculated exhaust gas based on current engine operating conditions. Exhaust gas exiting engine 120 through exhaust manifold 124 passes through EGR valve 134 where a portion of the exhaust gas may be diverted through EGR cooler 158, past EGR flow sensor 130, and temperature sensor 132 to mixing valve 136 where it is combined with compressed charge air. The remaining exhaust gasses not diverted by EGR valve 134 pass through turbine portion 152 of VGT 138 and muffler 160 before being exhausted to atmosphere. EGR cooler 158 cools the heated exhaust gas using engine coolant circuit 162. Engine coolant is in turn cooled via a cooling fan 164 and radiator 166.

In one preferred embodiment according to the present invention, EGR temperature sensor 132 provides a signal which is converted by an appropriate analog/digital converter in ECM 128 to a digital signal having a predetermined number of counts which corresponds to an EGR temperature. In this embodiment, 990 counts corresponds to an EGR temperature of 0° C. Due to the electrical characteristics of EGR temperature sensor 132, a broken ground wire will also produce a signal corresponding to 990 counts. As such, ECM 128 must discriminate between an accurate EGR temperature measurement corresponding to 0° C. and a sensor fault or malfunction which also produces 990 counts. The present invention utilizes at least one of a plurality of secondary sensors to determine whether a potential malfunction, i.e. a reading of 990 counts, is an actual malfunction or an accurate EGR temperature. The sensors may include the engine coolant temperature sensor, engine oil temperature sensor, ambient air temperature sensor, or any other sensors which may be used to infer a likely EGR temperature range. In one embodiment, elapsed engine running time is used to infer a valid EGR temperature range. If the elapsed engine running time exceeds a programmable threshold, it is determined that the actual EGR temperature should be above 0° C. and therefore an EGR temperature fault is indicated when the sensor output generates the maximum value of 990 counts. Alternatively, one or more of the secondary temperature sensors may be compared to corresponding programmable thresholds stored in ECM 128 to determine a valid or likely range for EGR temperature. For example, engine coolant temperature may be compared to a corresponding threshold to determine whether a reading of 0° C. for EGR temperature is likely or probable.

As will be appreciated by one of ordinary skill in the art, the representative values provided for one preferred embodiment of the present invention will vary based on the particular application and sensor being monitored. According to one aspect of the present invention, the sensor output (signal or corresponding digital value) is monitored and compared to a stored value corresponding to a maximum allowable value to indicate a potential sensor fault. Alternatively, the sensor output may be compared to a threshold with a potential fault being indicated when the output crosses the threshold. Secondary indicators are used to determine the reliability of the sensor value. If the secondary indicators are inconsistent with the sensor being monitored, a sensor fault is indicated.

Figure 3:
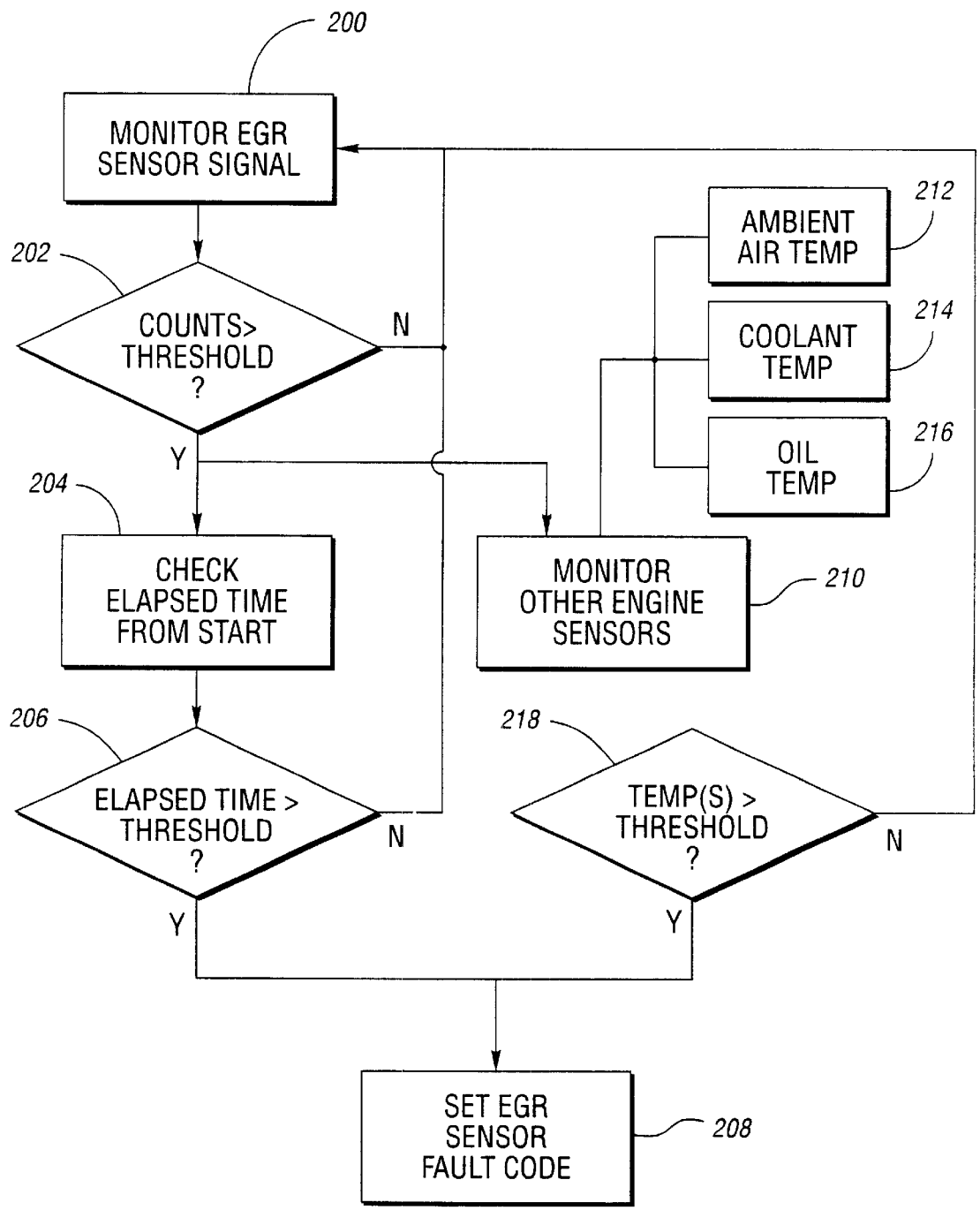
FIG. 3 is a flow chart illustrating operation of a system or method for detecting a sensor fault for a representative embodiment of the present invention.

Referring now to FIG. 3, a block diagram illustrating operation of one embodiment for a system or method for detecting a sensor fault according to the present invention is shown. As will be appreciated by one of ordinary skill in the art, the block diagram of FIG. 3 represents control logic which may be implemented or effected in hardware, software, or a combination of hardware and software. The various functions are preferably effected by a programmed microprocessor, such as included in the DDEC controller manufactured by Detroit Diesel Corporation, Detroit, Mich. Of course, control of the engine/vehicle may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated in FIG. 3. For example, interrupt or event driven processing is typically employed in real-time control applications, such as control of an engine or vehicle rather than a purely sequential strategy as illustrated. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In various embodiments of the present invention, the control logic illustrated is implemented primarily in software and is stored in computer readable storage media within the ECM. As one of ordinary skill in the art will appreciate, various control parameters, instructions, and calibration information stored within the ECM may be selectively modified by the vehicle owner/operator while other information is restricted to authorized service or factory personnel. The computer readable storage media may also be used to store engine/vehicle operating information for vehicle owners/operators and diagnostic information for maintenance/service personnel. Although not explicitly illustrated, various steps or functions may be repeatedly performed depending on the type of processing employed.

Block 200 represents monitoring of a sensor signal, such as the EGR temperature sensor signal. As described above, monitoring of the signal is equivalent to monitoring of the corresponding value associated with the signal. In one preferred embodiment, the signal is converted to an associated number of counts corresponding to a particular EGR temperature. Signal conditioning or conversion may be provided by the ECM or may be internal to the sensor. The sensor output is compared to a threshold or maximum value as represented by block 202. If the sensor output exceeds the threshold or is equal to the maximum (or minimum) allowable value, block 204 determines the elapsed engine running time from the latest engine start. Block 206 determines whether the elapsed time exceeds a programmable threshold. If so, an EGR sensor fault code is set by the ECM as represented by block 208.

Alternatively, or in combination, if a potential fault is indicated by block 202, block 210 may monitor other secondary indicators including various other temperature sensors such as ambient air temperature sensor 212, engine coolant temperature sensor 214, and engine oil temperature sensor 216. If one or more of the temperatures exceeds a corresponding threshold as indicated by block 218, a sensor fault code is indicated as represented by block 208.

Stated differently, block 202 monitors the sensor output to detect a potential sensor malfunction or fault. The ECM suppresses or inhibits generation of a diagnostic or fault code until secondary indicators suggest that the sensor output is inaccurate or invalid.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for discriminating between a sensor malfunction and engine conditions with similar or identical sensor signals in a compression ignition internal combustion engine, the system comprising:
   a first sensor for monitoring an engine condition;
   an engine control module in communication with the first sensor, the engine control module monitoring signals generated by the first sensor to detect a potential malfunction of the first sensor, monitoring secondary engine condition indicators to infer an estimated range of values for the first sensor, generating a sensor malfunction code based on the potential malfunction if the sensor signals generated by the first sensor are inconsistent with the estimated range of values determined by the secondary engine condition indicators.

2. The system of claim 1 wherein the secondary engine condition indicators comprise a timer which determines elapsed engine running time and wherein the estimated range of values corresponds to a threshold temperature for the first sensor.

3. The system of claim 1 wherein the first sensor is a temperature sensor.

4. The system of claim 1 wherein the secondary engine condition indicators comprise an engine coolant temperature sensor.

5. The system of claim 1 wherein the first sensor is an exhaust gas recirculation temperature sensor and the secondary engine condition indicators include an engine coolant temperature sensor.

6. A system for detecting an EGR temperature sensor fault in a compression ignition internal combustion engine, the system comprising:
   an EGR temperature sensor for providing an indication of recirculated exhaust gas temperature;
   an engine control module in communication with the EGR temperature sensor having a memory with stored data representing instructions executable by a processor to control the engine, the engine control module receiving signals from the EGR temperature sensor, converting the signals to corresponding digital values, comparing the digital values to a stored value associated with a potential EGR temperature sensor fault, and generating an EGR temperature sensor fault code if the potential EGR temperature sensor fault is indicated after a programmable elapsed engine running time.

7. The system of claim 6 further comprising:
   a coolant temperature sensor for providing an indication of engine coolant temperature, the coolant temperature sensor being in communication with the engine control module;
   wherein the engine control module converts signals generated by the coolant temperature sensor to corresponding digital values, compares the digital values to a programmable threshold, and inhibits generation of the EGR temperature sensor fault code while the digital values are below the programmable threshold.

8. The system of claim 6 further comprising:
   an oil temperature sensor in communication with the engine control module;
   wherein the engine control module converts signals generated by the oil temperature sensor to corresponding digital values, compares the digital values to an associated programmable threshold, and inhibits generation of the EGR temperature sensor fault code while the digital values are below the programmable threshold.

9. A computer readable storage medium having stored data representing instructions executable by a computer to control a compression ignition internal combustion engine having an EGR sensor, the computer readable storage medium comprising:
   instructions for monitoring EGR sensor output;
   instructions for comparing the EGR sensor output to a stored value corresponding to a maximum value to indicate a potential EGR sensor fault;
   instructions for determining elapsed engine running time;
   instructions for comparing the elapsed engine running time to a corresponding threshold;
   instructions for generating an EGR sensor fault when the potential EGR sensor fault is indicated and the elapsed engine running time exceeds the corresponding threshold.

10. The computer readable storage medium of claim 9 wherein the EGR sensor is an EGR temperature sensor and wherein the maximum value corresponds to a minimum EGR temperature.

11. The computer readable storage medium of claim 9 wherein the engine includes at least one temperature sensor, the computer readable storage medium further comprising:
    instructions for comparing output of the at least one temperature sensor to a corresponding threshold; and
    instructions for suppressing the EGR sensor fault until the temperature sensor output exceeds the corresponding threshold.

12. A method for detecting a malfunction of a primary sensor on an internal combustion engine including an engine control module in communication with a plurality of secondary sensors for indicating current engine operating conditions, the method comprising:
    monitoring a signal produced by the primary sensor;
    comparing a representative value associated with the signal to a corresponding fault value stored in the engine control module to indicate a potential malfunction of the primary sensor;
    monitoring at least one of the plurality of secondary sensors to determine whether the potential malfunction is an actual malfunction when the potential malfunction is indicated; and generating a primary sensor fault code when an actual malfunction is indicated.

13. The method of claim 12 wherein the step of monitoring at least one of the plurality of secondary sensors comprises monitoring at least one of an engine coolant temperature sensor, an engine oil temperature sensor, and an ambient air temperature sensor.

14. The method of claim 12 further comprising:

determining elapsed engine running time; and suppressing the step of generating a primary sensor fault code until after the elapsed engine running time exceeds a programmable threshold.

15. The method of claim 12 wherein the primary sensor comprises an EGR temperature sensor and the plurality of secondary sensors includes at least an engine coolant temperature sensor.

16. The method of claim 12 wherein the step of monitoring at least one of the plurality of secondary sensors comprises comparing at least one secondary sensor value to a corresponding programmable threshold stored in the engine control module.

17. A method for detecting a fault in an exhaust gas recirculation temperature sensor for a compression ignition internal combustion engine having an electronic engine control module in communication with the exhaust gas recirculation temperature sensor, the method comprising:

converting a signal received from the exhaust gas recirculation temperature sensor to a corresponding digital value indicative of exhaust gas recirculation temperature;

comparing the digital value to a programmable fault value stored in the electronic engine control module to determine whether a potential exhaust gas recirculation temperature sensor fault exists;

determining an elapsed engine running time; and generating an exhaust gas recirculation temperature sensor fault if the potential exhaust gas temperature fault exists after the elapsed engine running time exceeds a programmable threshold.

18. The method of claim 17 further comprising:

comparing the digital value to an expected value based on at least one other temperature sensor; and suppressing the exhaust gas recirculation temperature sensor fault if the digital value is within a predetermined range of the expected value.

19. The method of claim 18 wherein the at least one other temperature sensor comprises an engine coolant temperature sensor.

20. The method of claim 18 wherein the at least one other temperature sensor comprises an engine oil temperature sensor.

* * * * *